United States Patent
Schunter et al.

(10) Patent No.: US 7,770,000 B2
(45) Date of Patent: Aug. 3, 2010

(54) METHOD AND DEVICE FOR VERIFYING THE SECURITY OF A COMPUTING PLATFORM

(75) Inventors: Matthias Schunter, Zurich (CH); Jonathan A. Poritz, Wangen (CH); Michael Waidner, Au (CH); Elsie A. Van Herreweghen, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 12/124,619

(22) Filed: May 21, 2008

(65) Prior Publication Data

US 2008/0256595 A1 Oct. 16, 2008

Related U.S. Application Data

(63) Continuation of application No. 11/120,578, filed on May 2, 2005.

(51) Int. Cl.
*H04L 29/06* (2006.01)
*G06F 12/14* (2006.01)

(52) U.S. Cl. ............... 713/155; 713/164; 713/187; 713/193

(58) Field of Classification Search ............... None
See application file for complete search history.

(56) References Cited

U.S. PATENT DOCUMENTS 6,988,250 B1 1/2006 Proudler et al.
7,165,181 B2* 1/2007 Brickell ............... 713/182
7,350,072 B2* 3/2008 Zimmer et al. ............... 713/156
7,587,607 B2* 9/2009 Brickell et al. ............... 713/182
2003/0226031 A1 12/2003 Proudler et al.
2003/0236813 A1* 12/2003 Abjanic ............... 709/102
2003/0236818 A1 12/2003 Bruner et al.
2005/0132031 A1 6/2005 Sailer et al.
2008/0072329 A1* 3/2008 Herschaft ............... 726/25
2010/0031047 A1* 2/2010 Coker et al. ............... 713/176

OTHER PUBLICATIONS

Poritz et al. "Property Attestation-Scalable and Privacy-friendly Security Assessment of Peer Computers" IBM Research Report, May 10, 2004.*
Sadeghi et al. "Property-based Attestation for Computing Platforms: Caring about properties, not mechanisms" New Security Paradigms Workshop, Nova Scotia, Canada, Sep. 2004.*

* cited by examiner

*Primary Examiner*—Jung Kim
(74) *Attorney, Agent, or Firm*—Cantor Colburn LLP

(57) ABSTRACT

Method and device for verifying the security of a computing platform. In the method for verifying the security of a computing platform a verification machine is first transmitting a verification request via an integrity verification component to the platform. Then the platform is generating by means of a trusted platform module a verification result depending on binaries loaded on the platform, and is transmitting it to the integrity verification component. Afterwards, the integrity verification component is determining with the received verification result the security properties of the platform and transmits them to the verification machine. Finally, the verification machine is determining whether the determined security properties comply with desired security properties.

2 Claims, 3 Drawing Sheets

METHOD AND DEVICE FOR VERIFYING THE SECURITY OF A COMPUTING PLATFORM

CROSS-REFERENCE TO RELATED APPLICATIONS

This application is a continuation of U.S. patent application Ser. No. 11/120,578 filed on May 2, 2005, which is which is assigned to the same assignee as this application, International Business Machines Corporation of Armonk, N.Y. The disclosure of the above application is incorporated herein by reference.

TECHNICAL FIELD

The present invention relates to a method and a device for verifying the security of a computing platform. In more detail, the invention relates to a scheme of remotely proving the security of a computing platform.

BACKGROUND OF THE INVENTION

Processing critical information relies on the security of the computing platform. Typical security goals are to prevent such critical information from leaking beyond the realm of machines that are trusted by the user or to prevent corrupted machines from impacting the integrity of a computation. External verification of platform integrity enables a machine to verify that another machine meets certain security requirements. This is useful, for example, when a grid server wants to assure that a grid node is untampered before delegating a grid process to it.

In the following example two computers or machines A and B interact over a network, wherein in reality A and B might be two computers or two operating system images living on the same computer in parallel or even might be the same entity. In the example machine A can make certain statements about its own state, e.g. "I am . . . " or "My software . . . is in status x", or deliver a hash or checksum of this status (h(x)), or certain properties, e.g. "I am running version . . . of Linux". Machine A can send these statements to machine B, but why should machine B trust machine A with respect to the correctness of these statements? If machine A is corrupted by a hacker, it could make arbitrary claims about itself.

Therefore, it is necessary to implement a proving method with which machine B can verify whether the statements made by machine A are correct. The embodiment of such a proving method is shown in FIG. 1. In the following, machine A is called verified machine or the prover and machine B the verifier. All solutions to this problem assume that there is a piece of hardware, called trusted platform module TPM, which cannot be compromised, and which can make reliable statements about the rest of the system A. Specifically, the industry consortium Trusted Computing Group (TCG) has specified the trusted platform module TPM, which can compute a checksum of the system configuration of machine A, wherein the checksum can be computed for a system configuration in which all or only a part of the software is running on machine A. In a further step the computed checksum is signed, and afterwards send off to the verifier B. The corresponding protocol is shown in FIG. 2.

The Trusted Computing Group is an IT industry consortium which has developed a specification of a small, low-cost commodity hardware module, called trusted platform module (TPM). The TPM can serve as a root of trust in remote (and local) platform verification. The base TCG model of this configuration verification process, called binary attestation, aims at measuring all executed code. Therefore, each measured piece of software stores metrics of a sub-component into the TPM before executing it, wherein the metrics are hash values of the configuration's components. The metrics are bootstrapped by the basic input output system (BIOS) that is trusted by default and that is measuring and storing the boot loader. The chain of trust can then be extended to the operating system components and to the applications and their configuration files. Once the executables are measured into the TPM, the TPM can reliably attest to the metrics of the executed components by signing the metrics with a TPM-protected key. The signed metrics, also called integrity metrics, can then be transmitted to a verifying machine. This verifier machine, or in short verifier, can decide whether to consider the verified machine trustworthy enough to involve it in a subsequent computation. As will be elaborated hereinafter, this straightforward approach of binary attestation lacks scalability, privacy, and openness. The main reason is that the whole configuration is transmitted (limited privacy), that the verifier needs to know all configurations of all machines to be verified (limited scalability), and that the verifier checks binaries that are specific to a vendor and operating system (limited openness).

Hereinafter, the binary attestation and verification is explained. The ability of the TPM reliably to report on the verified platform's computing environment follows from the TPM-enabled measurement and reporting. The measurement and storage of integrity metrics is started by the BIOS boot block (a special part of the BIOS which is believed to be untampered) measuring itself and storing the measurements in a TPM PCR (platform configuration register) before passing control to the BIOS. In the same way, the BIOS then measures option ROMs and the boot loader and records these measurements in a TPM PCR before passing control to the boot loader. The process continues as the boot loader measures and stores integrity metrics of the operating system (OS) before executing it. The OS in turn measures and stores integrity metrics of additionally loaded OS components before they are executed. If support by the OS is provided, applications can also be measured before being executed. The measurement and reporting processes are depicted in a simplified manner in FIG. 2, in which 'H represents the cryptographic hash function SHA-1. During initialization, various platform configuration registers PCRx as well as a configuration log file log (stored on the platform) are initialized. This log file log keeps track of additional information such as descriptions or file paths of loaded components. Its integrity need not be explicitly protected by the TPM. During subsequent measurement of components, this log file log is extended, while metrics (hash values) of the executables are stored in the TPM using the tpm_extend method replacing the contents of the appropriate platform configuration register PCRx with the hash of the old contents and the new metrics, wherein metrics of loaded components are reliably stored in the TPM. When a remote verifier B wants to assess the security of the verified platform A, the verifier B sends a challenge c to the platform A. The platform A uses this challenge c to query with a tpm_quote command the TPM for the value of the platform configuration registers PCR. The TPM responds with a signed message $sign_{AIK}(\overrightarrow{PCR}, c)$ containing the PCR values and the challenge c. The platform A returns this signed quote to the challenger (verifier B) together with information from the log file needed by the verifier to reconstruct the verified platform's configuration. The verifier B can then decide whether this configuration is acceptable. The key used for signing the quote is an attestation identity key AIK of the TPM. As a TPM may have multiple attestation identity keys, the key or its identifier has to be specified in the tpm_quote request. An attestation identity key AIK is bound to a specific TPM. Its public part is certified in an attestation identity key certificate by a privacy-certification authority as belonging to a valid TPM. The verifier of a quote signed with a correctly certified AIK believes that the quote was produced by a valid TPM, more specifically, by the unique TPM owning that AIK. This belief is based on the assumption that the TPM is not easily subject to hardware attacks and that effective revocation mechanisms are in place dealing with compromised keys.

Note that the above measurement process does not prohibit execution of untrusted code, it only guarantees that the measurement of such code will be securely stored in the TPM. Thus, if malicious code is executed, the integrity of the platform A may be destroyed. However, the presence of an untrusted (or simply unknown) component will be reflected by the TPM quotes not matching the correct or expected values.

The checksum computed by the trusted platform module TPM depends on all details of the configuration, which means there will be an extremely large number of different checksum configurations corresponding to trustworthy. Thus, this solution disadvantageously does not scale: in general the verifier B will need to know which checksums are the trustworthy ones, and hence the only way for the verifier B is to enumerate all the correct values, which obviously works for small, closed systems only. It will not work for open systems. This approach is known as binary attestation. Further information about the Trusted Computing Group and the trusted platform module can be found in The Trusted Computing Group, Main specification version 1.1b, 2003, which is available from http://www.trustedcomputinggroup.org.

The trusted platform module TPM also supports trusted booting, which means that the prover A can go through a sequence of steps. In each step a new component is loaded e.g., first the boot loader, then the operating system, and then an application. The TPM ensures that critical data will be accessible and third party-recognized attestations can be produced by a given software layer only if that layer and all previous ones are occurring as part of a known, well defined execution sequence.

A related, theoretically well investigated feature is secure booting. The difference to trusted booting is that a system with secure booting either boots a specific, pre-defined system or does not boot at all, while a system with trusted booting can boot any system, but certain data are accessible only if it boots into a pre-defined system. The details of how a secure boot process can be carried out can be looked up in B. Yee, "Using secure coprocessors", Technical Report CMU-CS-94-149, Carnegie Mellon University School of Computer Science, May 1994.

The binary attestation mentioned requires the verified platform to transmit to the verifier a cryptographically-strong checksum of essentially its entire configuration and current status. Such precise configuration information provides not only a scaling problem for the verifier, but also a privacy problem for the verified machine: the exact configuration is likely to provide a great deal of disambiguating information, perhaps sufficient to completely identify the platform which is requiring verification. Moreover, this approach violates the fundamental principle of good privacy-aware engineering, by answering a simple question—the verifier's query of the security state of the verified machine—with a great deal of superfluous information—the entire configuration of the verified machine.

Further, binary attestation by requiring a machine to transmit its entire configuration to the verifier allows, or even encourages, vendors to offer services over the network only to those platforms which are running software which the vendor recognizes and approves of, not simply to all platforms running software with the needed security properties. Thus binary attestation is inherently discouraging of openness in the software arena.

The fundamental problem with the TCG model of attestation is that checksums have no inherent semantics, they are just bit strings. The only way for the verifier to give them meaning is to compare them with other checksums for which that meaning is known a priori.

SUMMARY OF THE INVENTION

Therefore, one object of the invention is to provide a scalable method for verifying the security of a computing platform. Another object of the invention is to improve privacy. Furthermore, it is an object of the invention to provide an open system and to allow a verifier to easily verify the computing platform, i.e. extensive comparisons between checksums and lavish databases of trustworthy checksums can be avoided.

This means that the invention is proposing a way to do attestation based on the existing TPM specification, wherein with the invention the scalability problem is avoided. The invention also offers better privacy and efficiency than the original TCG solution.

According to one aspect of the invention, the object is achieved by a method for verifying the security of a computing platform with the features of the first independent claim and by a device for verifying the security of a computing platform.

In the method for verifying the security of a computing platform according to the invention a verification machine is first transmitting a verification request via an integrity verification component to the platform. Then the platform is generating by means of a trusted platform module a verification result depending on binaries loaded on the platform, and is transmitting it to the integrity verification component. Afterwards, the integrity verification component is determining with the received verification result the security properties of the platform and transmits them to the verification machine. Finally, the verification machine is determining whether the determined security properties comply with desired security properties.

The device for verifying the security of a computing platform according to the invention comprises an integrity verification component, which is provided for transmitting a verification request from a verification machine to the platform. The platform comprises a trusted platform module for generating a verification result depending on binaries loaded on the platform. The integrity verification component is provided for determining the security properties of the platform with the help of the verification result and for transmitting them to the verification machine. The verification machine is able to determine whether the determined security properties comply with desired security properties.

Advantageous further developments of the invention arise from the characteristics indicated in the dependent patent claims.

Preferably, in the method according to the invention the verification request comprises a challenge command.

In an embodiment of the method according to the invention the verification request comprises an attestation identity key.

In another embodiment of the method according to the invention the verification request comprises a trusted policy verification, also referred to as trust policy of the verifier.

In a further embodiment of the method according to the invention the integrity verification component is determining the platform configuration with the help of configuration descriptors.

Over and above this, in the method according to the invention the integrity verification component can determine the security properties with the help of the platform configuration.

Advantageously, in the method for verifying the security of a computing platform according to the invention, the integrity verification component is furthermore using a configuration assurance certificate for determining the security properties.

In the method according to the invention the integrity verification component is generating a key and transmitting it to the trusted platform module which is using the key for encrypting the attestation of the verification result.

Further, a trusted software-only TPM-like module could be applied providing the same functionality and improvements in privacy, scalability and openness.

Additional objects and advantages of the invention will be set forth in the description which follows, and in part will be obvious from the description, or may be learned by practice of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

Figure 1:
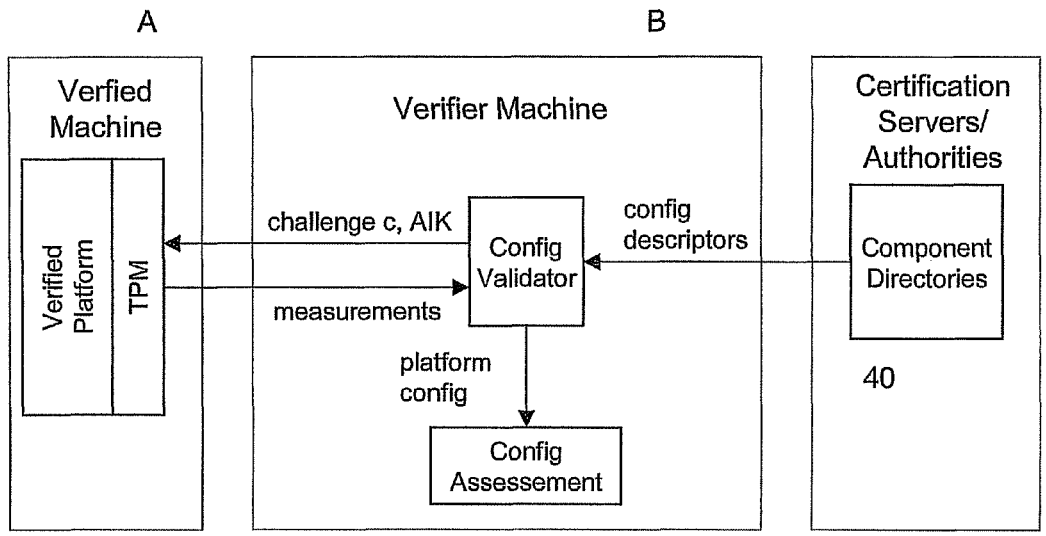
FIG. 1 illustrates a block diagram of the architecture for a system for binary attestation according to the prior art.
Figure 2:
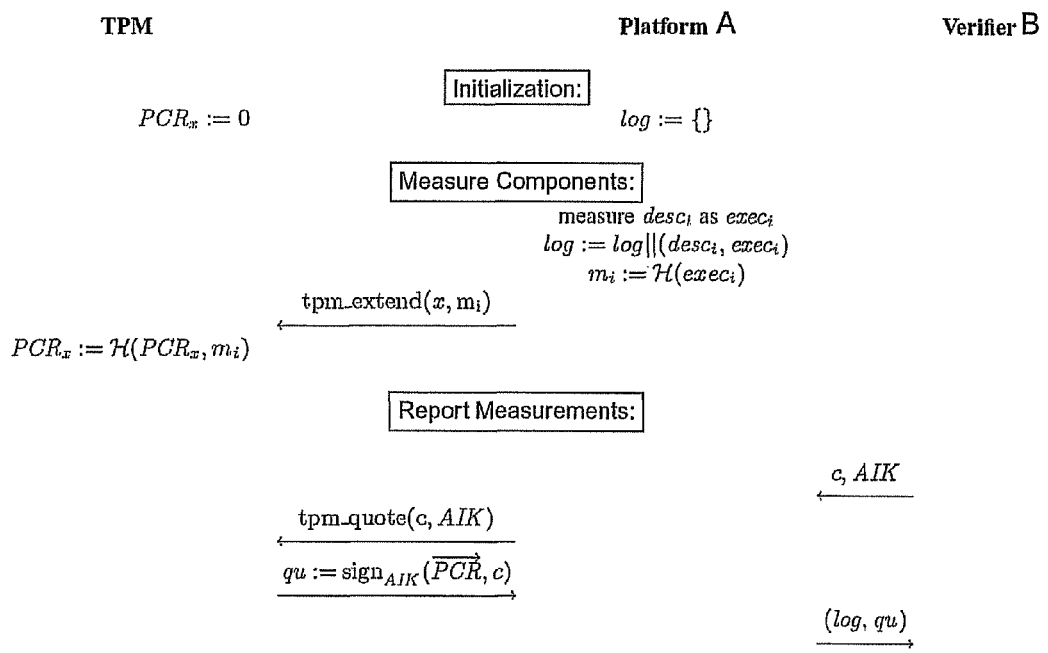
FIG. 2 illustrates a protocol for the architecture shown in FIG. 1.

The problem with the above-mentioned binary attestation is that checksums have no inherent semantics, they are just bit strings. The only way for the verifier to give them meaning is to compare them with other checksums for which the meaning is known a priori. In the method according to the invention this burden is moved from the verifier to the prover A, more specifically to a component in hardware, firmware or software, which is called in the following the integrity verifier component IVC. Using trusted booting it is ensured that if an integrity verifier component IVC exists at the prover A then it is the correct one, i.e., it is an IVC the verifier B can trust. The integrity verifier component IVC verifies any security statement according to a given policy, e.g., a policy chosen by the verifier, and sends to the verifier just the result of this verification, e.g. whether the security statement is fulfilled or not.

The verifier B can check the authenticity of this result in a number of ways, e.g., the integrity verifier component IVC might digitally sign the result, or might use the original attestation mechanism.

The invention assumes a system with a trusted platform module TPM that supports attestation and, indirectly, trusted booting. Assuming the following situation: The prover A wants to make statements related to a specific piece of code, APP. A primitive statement could be a property that can be computed from the digital representation of the code APP, e.g., a checksum CHS, or it could be a statement that someone else made about the code APP, e.g., "IBM takes liability for APP", or "Some common criteria lab says that APP implements Linux". Statements about the code APP can be composed out of primitive statements about the code APP in the usual way (any Boolean combination). One can generalize this also to combine statements about various pieces of code, APP1, APP2, etc. Primitive statements can be verified by the prover A itself (not by the verifier) by any of a number of techniques: computed properties can be checked against a remote database or locally known values, and any property can be checked against digitally signed attribute certificates. The specific statement to be made is known to both verifier B and prover A, e.g., because the verifier B has sent it to the prover A.

Now, the verifier B wants to verify that the statement made by the prover A is true, based on the assumption that the trusted platform module TPM works as supposed, that trusted booting based on the trusted platform module TPM also works as supposed (in TCG-speak this requires that the core root of trust module CRTM is intact), and that the verifier B can verify the origin of attestations produced by the trusted platform module TPM.

In the following two variants A) and B) of the invention are described.

A) In a No-Key Variant the Following Steps are Performed:

Prover A:

1. The trusted platform module TPM and the integrity verifier component IVC are started. Trusted booting ensures that the integrity verifier component IVC is correct.

2. The integrity verifier component IVC verifies the desired properties of the code APP, as explained above, i.e. the IVC checks for example certificates, checksums, etc.

3. The integrity verifier component IVC inputs the statement to be verified plus the result of this verification to the trusted platform module TPM for attestation.

4. The trusted platform module TPM attests to the checksum CHS of the started integrity verifier component IVC, the statement to be verified VS, and the result of this verification VR.

5. The result is sent to the verifier B.

Verifier B:

1. The verifier B checks whether the attestation contains the correct checksum CHS of the integrity verifier component IVC, whether the statement to be verified VS is correct and the verification result VR.

B) In a Public-Key Variant the Following Steps are Performed:

Prover A:

1. The trusted platform module TPM and the integrity verifier component IVC are started. Trusted booting ensures that the IVC is correct.

2. The integrity verifier component IVC generates a key pair with a secret part SK and public part PK and inputs the public key PK into the trusted platform module TPM for inclusion in the attestation.

3. The trusted platform module TPM attests to the checksum CHS of the integrity verifier component IVC and the public key PK, i.e., the TPM creates a quote like sign_TPM (hash(IVC), challenge, PK).

4. The integrity verifier component IVC verifies the integrity of the code APP, as explained above and generates a verification result VR.

5. The integrity verifier component IVC signs the statement to be verified VS and the verification result VR using the secret key SK.

6. The integrity verifier component IVC submits to the verifier B a signed verification result sign(VR) as well as an attestation to the integrity verifier component IVC and its public key PK.

Verifier B:

1. The verifier B checks whether the attestation to the integrity verifier component IVC has the correct checksum.

2. The verifier B checks whether the public key PK is included in the attestation.

3. The verifier B checks whether the statement to be signed and the verification result VR have been signed, using the public key PK for verification.

Figure 4:
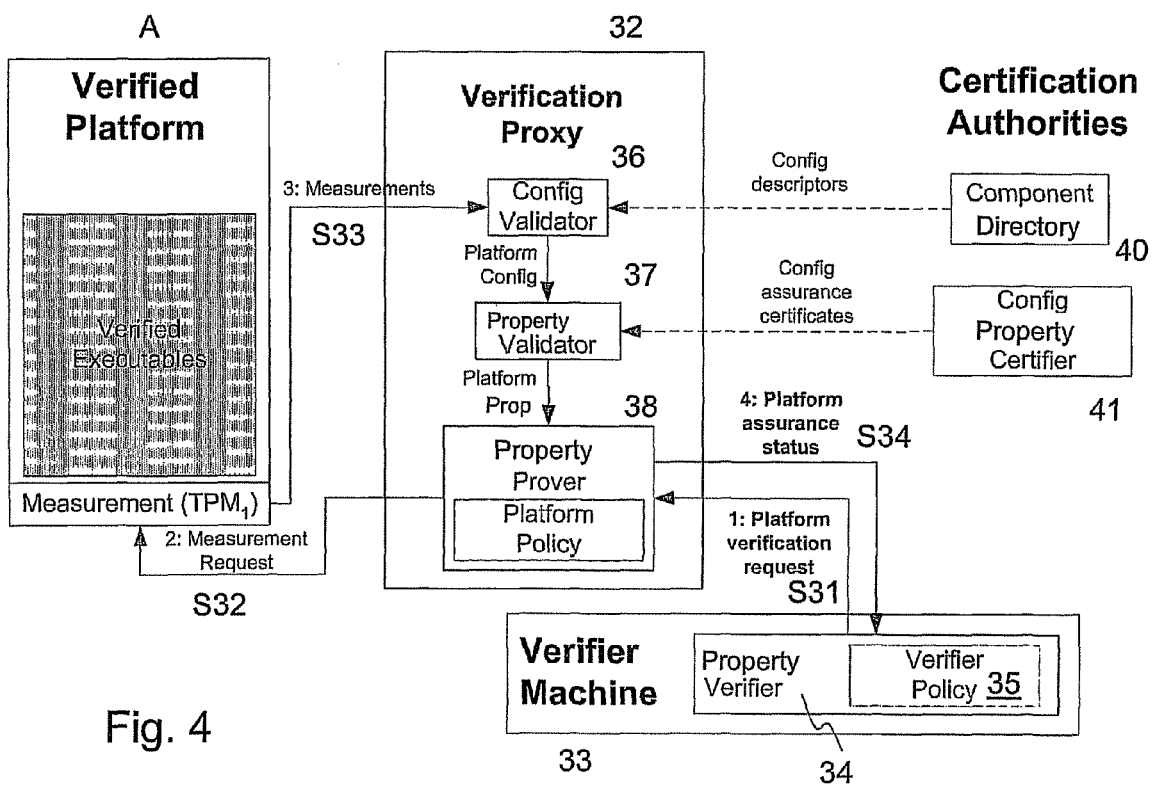
FIG. 4 illustrates a block diagram of the architecture for a system for property attestation according to the invention.

FIG. 4 shows the component architecture of a property attestation system. The property attestation architecture comprises the following components:

A property certifier 41 is part of the property attestation architecture and is an agent that describes and certifies which security properties are associated with which software component, for example, manufacturers can certify properties of their products (such as offering certain services), evaluation authorities can certify their evaluation results (such as common criteria assurance level for a given protection profile), or enterprises or other owners of the machines can self-certify the code that they deem acceptable. An example for a security property is whether an operating system is capable of digital rights management (DRM).

Figure 3:
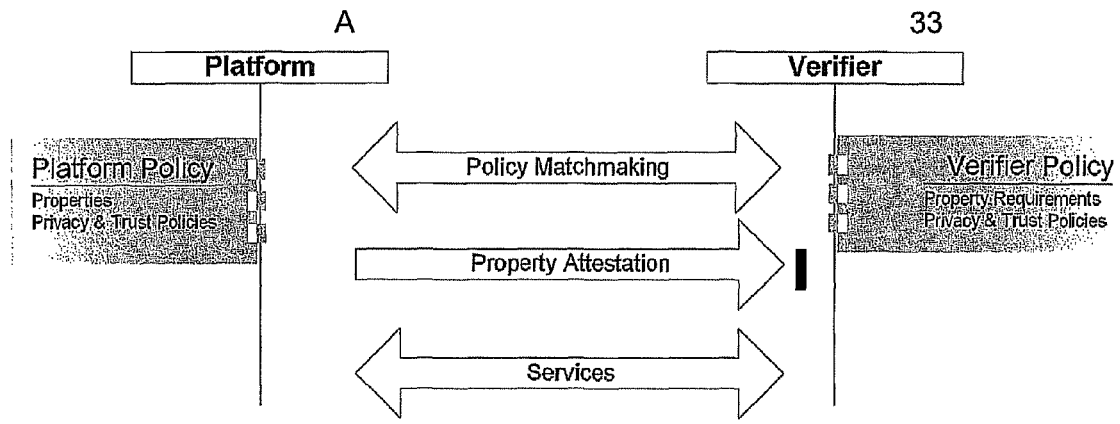
FIG. 3 illustrates a schematic view of a protocol for property attestation according to the invention.

A verification proxy 32 is also a part of the property attestation architecture. Towards the verified platform A, the verification proxy 32 acts as a verifier of binary attestations; towards the verifier machine 33, it acts as the verified platform in the high-level property attestation view of FIG. 3. When the verification proxy 32 receives a platform verification request S31 from the verifier machine 33, it challenges the verified machine A for integrity measurements S33 via a measurement request S32. The resulting measurements S33 are then transformed into a platform configuration Platform Config by means of a configuration validator 36, and subsequently into platform properties Platform Prop by means of a property validator 37. The property validation is based on property assurance certificates (binding components and configurations to properties) issued by property certifiers 41.

Finally, a property verifier 34 is also part of the property attestation architecture. This module engages with the property prover 38, i.e. the verified platform A, in the property attestation exchange. The requirements of the property verifier 34 are based on the verifier policy 35 (property requirements and trust policy) that it requires as an input.

Property Attestation Trust Model

The verified platform A or its user needs to trust in its integrity (correct operation and authenticated channel) and confidentiality (confidential channel and no information leakage) in order to guarantee privacy. The verifier 33 in turn needs to trust in the integrity of the verification proxy 32 in order to believe the properties that the verification proxy 32 outputs. In addition, the verifier 33 needs to know a verification proxy signature key (public/private key pair) that is used by the verification proxy to authenticate its verification results.

Figure 5:
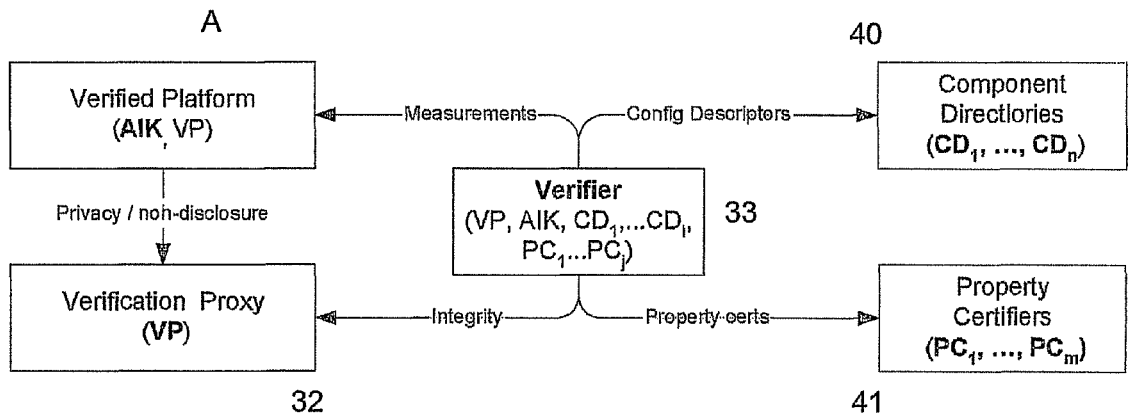
FIG. 5 illustrates a trust model for property attestation according to the invention.

FIG. 5 depicts the trust model for property attestation. Each entity A, 32, 33, 40, 41 is shown together with the public signature verification keys that it needs to know. Bold identifiers represent key-pairs of the entity. The arrows in the FIG. 5 represent trust relations between entities (or, in fact, trust policies associated with public keys): The verified platform A owns an attestation identity key AIK and knows the verification proxy's public key VP. The verified platform A trusts the owner of the public key VP to protect the confidentiality of its measurements. In the privacy policy model of FIG. 5 the verification proxy 32 is thus the single entity to which the verified platform A wants to send configuration information. The verification proxy 32 owns its signature key-pair VP. Each component directory i, which is depicted in FIGS. 4 and 5 with reference sign 40, owns a key-pair CDi with which it certifies configuration descriptors. Each property certifier i, which is depicted in FIGS. 4 and 5 with reference sign 41, owns a key-pair PCi with which it certifies properties related to (sets of) components. The verifier 33 knows the attestation identity key AIK, which is public, of the platform A about which it wants to receive property attestation. The verifier 33 trusts that measurements authenticated with that attestation identity key AIK correctly represent the configuration of the platform A based on the TPM certified with the attestation identity key AIK even though he does not see them. The verifier 33 also knows the public key VP of the verification proxy 32 and trusts the integrity of property attestations with that key. The verifier 33 trusts configuration descriptions authenticated with the keys CD1 . . . CDn and property certificates authenticated with the keys PC1 . . . PCm.

Figure 6:
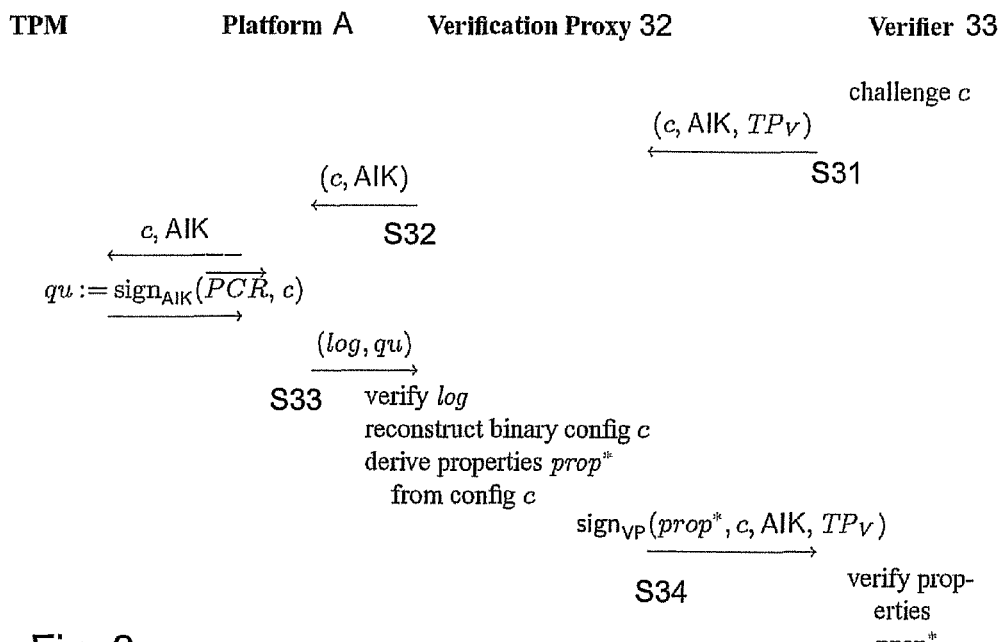
FIG. 6 illustrates a protocol for the architecture as shown in FIG. 4.

In the following the protocol for property attestation based on the above mentioned trust model is described. The protocol is represented in FIG. 6. The exchange is triggered by the verifier 33 who requests to receive property attestation about the platform A associated with the attestation identity key AIK. The protocol steps are named corresponding to the names of basic message flows and components in FIG. 4.

The verifier 33 sends a message S31 called platform verification request to the verification proxy 32 which comprises a randomly generated 160-bit challenge (nonce) c, the attestation identity key AIK about which it wants property attestation, and its trust policy $TP_V$ or part thereof As mentioned above, it is assumed that the verifier 33 does not desire to protect the privacy of the transmitted part of its trust policy. It is also assumed that the verifier 33 receives all the properties the verified platform A can guarantee under this trust policy.

Then, using an authenticated channel, the verification proxy 32 forwards a measurement request S32 comprising the challenge c and the attestation identity key AIK to the verified platform A. The verified platform A decides whether or not to continue based on its policy and trust model. It is assumed that the verified platform A knows the public key VP as the key of a trusted verification proxy and continues by requesting a TPM quote. Note that the challenge c used between verification proxy 32 and the verified platform A (and TPM) needs not to be the same as the challenge c used between verification proxy 32 and verifier 33. Indeed, it is up to the verification proxy 32 to judge the correctness and freshness of the actual TPM quote.

In a third step, the verified platform A requests and receives the AIK-authenticated quote qu using the challenge c.

In a further step, the verified platform A sends the quote qu and at least part of a log-file (S33) to the verification proxy 32 using a confidential channel.

Configuration Validation

Then, the verification proxy 32 reconstructs the platform's configuration using the authenticated metrics (PCR quote), the log file and (potentially) config descriptors certified by keys within the trust policy $TP_V$ of the verifier 33. PCR is the checksum generated by the TPM.

Property Validation

Now, the verification proxy 32 derives the properties prop* of the platform's components based on property certificates certified by keys within the trust policy $TP_V$.

Platform Property Status

Finally, the verification proxy 32 returns an authenticated message S34 containing the platform verification request and the properties that can be assured. The verifier 33 checks whether this response is authenticated with a key which its policy considers to belong to a trusted verification proxy. If so, the verifier 33 trusts that the properties returned can currently be guaranteed by the verified platform A associated with the attestation identity key AIK under the announced trust policy $TP_V$.

Note that the protocol in FIG. 6 assumes that the security of the verification proxy 32 is guaranteed. In addition, it is assumed that messages from the verification proxy 32 to the platform A and the verifier 33 are authenticated while messages from the verified platform A to the verification proxy 32 are kept confidential (denoted by auth and conf, respectively).

It should be also noted that more complex privacy policies (e.g., the verified platform also protecting which properties can be proved to which verifiers under which trust policy) may require also authentication by the verifier 33 of the initial request message, as well as confidentiality protection of the verification proxy's response to the verifier 33.

It is assumed that high-level security properties about a platform can be guaranteed only if all components on the verified platform A are measured; this assumes that the measurement process as depicted in FIG. 6 continues up to the application level. Thus the verification proxy 32 should not attest to any properties unless it can convince itself that the verified platform's configuration indeed supports that extended measurement.

It should be noted that the TCG-compliant TPM referred to in this entire application could easily be replaced by some other hardware or software module which has the capabilities implied by the claims, diagrams and explanations; in particular, a software-only TPM-like module would certainly be possible, and would give the same functionality and improvements in privacy, scalability and openness, slightly changing only the trust model of this implementation.

Having illustrated and described a preferred embodiment for a novel method and apparatus for, it is noted that variations and modifications in the method and the apparatus can be made without departing from the spirit of the invention or the scope of the appended claims.

What is claimed is:

1. A method for verifying the security of a computing platform, the method comprising:

receiving, at an integrity verification component (IVC) embodied by one of: a hardware component, a firmware component and a processor executed software component, a platform verification request from a verification machine, the platform verification request including a challenge command, an attestation identify key corresponding to the computing platform to be verified, and a trusted verification policy, wherein the IVC comprises a separate, intermediate entity with respect to the computing platform and the verification machine;

based upon the platform verification request received from the verification machine, transmitting from the IVC to the computing platform, a measurement request containing the challenge command and the attestation identify key, without the trusted verification policy;

receiving, at the IVC, measurement results from the computing platform responsive to the measurement request, and generating, within the IVC, a verification result based on the verification request, the measurement results, configuration descriptors, and a configuration assurance certificate; and transmitting, from the IVC to the verification machine, a platform assurance status, the platform assurance status including the security properties determined by the IVC to the verification machine, wherein the security properties comprise a result of whether a security statement is either fulfilled or not;

wherein the verification machine is configured to determine whether the security properties transmitted by the IVC comply with desired security properties.

2. A system for verifying the security of a computing platform, comprising:

an integrity verification component (IVC), embodied by one of: a hardware component, a firmware component and a processor executed software component, in communication with a verification machine;

the IVC configured to receive a platform verification request from the verification machine, the platform verification request including a challenge command, an attestation identify key corresponding to the computing platform to be verified, and a trusted verification policy, wherein the IVC comprises a separate, intermediate entity with respect to the computing platform and the verification machine;

the IVC further configured to transmit, based upon the platform verification request received from the verification machine, a measurement request to the computing platform, the measurement request containing the challenge command and the attestation identify key, without the trusted verification policy;

the IVC further configured to receive measurement results from the computing platform responsive to the measurement request, and generate, within the IVC, a verification result based on the verification request, the measurement results, configuration descriptors, and a configuration assurance certificate; and the IVC further configured to transmit, to the verification machine, a platform assurance status, the platform assurance status including the security properties determined by the IVC to the verification machine, wherein the security properties comprise a result of whether a security statement is either fulfilled or not;

wherein the verification machine is configured to determine whether the security properties transmitted by the IVC comply with desired security properties.

* * * * *